United States Patent
Intrater et al.

[19]

[11] Patent Number: 5,867,718
[45] Date of Patent: Feb. 2, 1999

[54] METHOD AND APPARATUS FOR WAKING UP A COMPUTER SYSTEM VIA A PARALLEL PORT

[75] Inventors: Amos Intrater, Netanya; Erez Bar-Niv, Raanana, both of Israel

[73] Assignee: National Semiconductor Corporation, Santa Clara, Calif.

[21] Appl. No.: 564,952

[22] Filed: Nov. 29, 1995

[51] Int. Cl.$^6$ .................................................. G06F 1/32
[52] U.S. Cl. ............... 395/750.05; 395/821; 395/182.12
[58] Field of Search ..................................... 395/750, 821, 395/500, 750.05, 182.12

[56] References Cited

U.S. PATENT DOCUMENTS

| | | |
|---|---|---|
| 4,590,553 | 5/1986 | Noda . |
| 4,593,323 | 6/1986 | Kanda et al. . |
| 5,167,024 | 11/1992 | Smith et al. . |
| 5,218,704 | 6/1993 | Watts, Jr. et al. . |
| 5,359,540 | 10/1994 | Ortiz ........................................ 364/492 |
| 5,555,436 | 9/1996 | Gavish . |
| 5,557,225 | 9/1996 | Denham et al. . |
| 5,560,023 | 9/1996 | Crump et al. . |
| 5,644,593 | 7/1997 | Bailey et al. . |
| 5,664,203 | 9/1997 | Hong et al. . |

*Primary Examiner*—Meng-Ai T. An
*Assistant Examiner*—Rupal D. Dharia
*Attorney, Agent, or Firm*—Skjerven, Morrill, MacPherson, Franklin & Friel LLP; Norman R. Klivans

[57] ABSTRACT

A method and apparatus for waking up a computer system using a peripheral device connected to a standard parallel port of the computer system. Functionality is added to the parallel port Select line normally used to indicate that the peripheral device connected to the parallel port is on line when the select signal is high. A signal transition on the Select line from low to high is detected and used to wake up the computer system. This toggling of the Selected line is detected and used to activate the computer system power supply into a normal operating state from a power save state.

10 Claims, 2 Drawing Sheets

METHOD AND APPARATUS FOR WAKING UP A COMPUTER SYSTEM VIA A PARALLEL PORT

BACKGROUND OF THE INVENTION

1. Field of the Invention

This invention relates to computer systems and more specifically to powering up a computer system from a peripheral device connected to a standard parallel port of the computer system.

2. Description of the Prior Art

Personal computers, e.g. portable and desk top computers, often include a power management function. When the computer is inactive (not executing an application program or otherwise in use) the computer is placed in a standby mode. In the standby mode, typically only the memory is powered and a power management logic chip or chips are powered up. When the computer needs to resume operation due to keyboard input or other activity, the power management logic circuitry activates the power supply and powers up other portions of the computer including for instance the CPU (central processing unit).

However this presents the problem that devices such as Multi-Functional Peripherals (such as a combination facsimile machine-printer) connected to a parallel port of the computer may require the attention of the CPU when the CPU is powered down. For instance, if a facsimile is received by the facsimile machine, it must be stored into the computer's disk drive. If the computer is in the standby mode, the facsimile machine-printer connected to the parallel port needs a way to wake up (power up) the CPU of the computer and the disk drive which are powered down in the standby mode. However, no such feature is now available. It is also important that this wake up be performed quickly and be implemented in inexpensive fashion to make it suitable for use with a variety of computers.

SUMMARY

In accordance with the present invention, a computer is woken up by a peripheral device connected to a parallel port of the computer, with no additional signals required, while maintaining compatibility with older computers and peripheral devices. This is done advantageously with a fast wake-up time and also without routing any high voltage power lines through the peripheral device (see U.S. Pat. No. 5,359,540 to Ortiz). This is also different from some prior art approaches where a modem in the computer detects an incoming call and uses a ring indicator line in the computer serial port to wake up the computer.

As is well known, the "Select" line present in standard computer parallel ports is used to indicate that a peripheral device connected to the parallel port is "on line" when the Select line carries a logic high signal. In accordance with the invention, the Select line is used to provide further functionality. Thus a transition (change in voltage level) on the Select line, e.g. from low to high voltage, is used to wake up the computer. Whenever the peripheral device requires the attention of the computer, and the computer does not respond (is in the standby mode), the peripheral device in response toggles its Select line output signal from logic high to logic low and back to logic high, thus creating a negative pulse of predetermined duration. (In other embodiments this is a positive pulse.) The power management logic circuitry in the computer detects this transition and in response activates the power supply, i.e. powers up the CPU and other portions of the computer which had been powered down. Further, a reset routine in the BIOS checks which peripheral initiated the power up, and then the computer BIOS reset routine invokes the appropriate application program to handle the wake up event.

Another reason to wake up the computer is the so called "hot insertion" of a peripheral. That is, when one connects a powered-up peripheral to the parallel port of a powered-down computer, the computer is woken up to check what type of peripheral has been connected so as to select the appropriate software driver.

The present approach is compatible with standard parallel port protocols and emulates the situation where a peripheral device momentarily goes "off line". Thus this approach does not interfere with the normal operation of the parallel port to carry information between the peripheral device and the computer.

DETAILED DESCRIPTION

Figure 1:
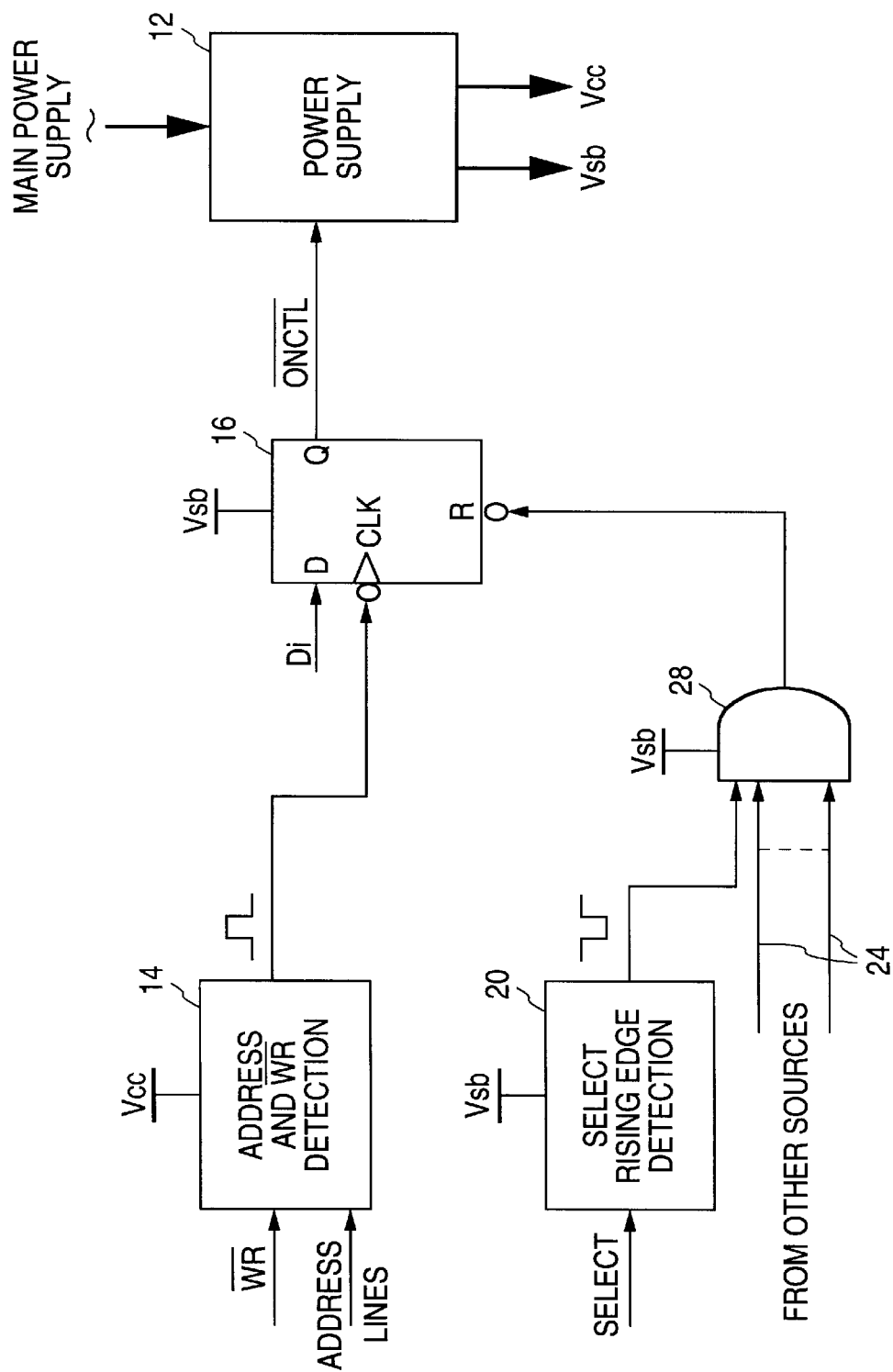
FIG. 1 shows circuitry in accordance with the present invention.

FIG. 1 shows circuitry in accordance with the present invention in block diagram form as a portion of a computer system. It is to be understood that the circuitry of the present invention is typically installed in a personal computer and connected to the computer parallel port. Most computers include at least one parallel port for connection of a printer or other peripheral device such as a scanner. The configuration of parallel ports is standardized in terms of the various lines. Parallel ports are sometimes referred to as the "printer port". The present circuitry can of course be in the form of discrete components, an integrated circuit, or integrated into a larger integrated circuit, e.g. an I/O controller chip.

The computer system, only a portion of which is shown in FIG. 1, includes a power supply 12 which (typical of computers which may operate in a standby mode) provides two outputs. The first is $V_{cc}$ which is the main power supply of the computer for normal operations. The second is $V_{sb}$ which is a "trickle current" standby power supply used to power the computer elements which remain active in the standby mode (or during most other power saving modes). It is to be understood that the present invention is not limited to computers having the capability to operate in specifically the standby mode, but in general applies to computers which operate in at least two modes, an ordinary operating mode and a power conservation mode. The power supply 12 is conventionally switched between outputting $V_{cc}$ and not outputting $V_{cc}$ by the state of a control signal $\overline{ONCTL}$. $V_{sb}$ is supplied when the computer is in a power save mode or in ordinary operation.

In such a computer the computer application software directs the computer to enter the standby (or other power save) mode by writing a signal "one" on line $D_i$ to the power management logic which includes in this example address and write detection circuitry 14 and flip flop 16. The $\overline{WR}$ signal is a control signal generated by the computer CPU in response to any write access, indicating that the CPU is writing data. The circuitry 14 decodes the $\overline{WR}$ signal in combination with those signals on the Address lines and in response sends a clock pulse as shown to the falling edge clock (CLK) terminal of flip flop 16. Thus the value "one"

($D_i$) written by the software is latched onto the Q output terminal of the flip flop 16 by the clock pulse, providing a logic high signal $\overline{ONCTL}$ to power supply 12, thereby turning off the main supply $V_{cc}$ in power supply 12. The signals on the $\overline{WR}$ line, the Address lines, and line $D_i$ are provided from the CPU. Note that the address and write detection circuitry 14 is powered by $V_{cc}$ while the flip flop 16 is powered by $V_{sb}$.

The Select line is one of the lines conventionally present in the parallel port. (The other lines of the parallel port are not shown herein as being conventional). This Select line of the parallel port in accordance with the invention is connected to the input terminal of a select rising edge detection logic circuit 20. When the signal on the Select line switches from low to high as described above, the select rising edge detection circuit 20, which is powered by the supply $V_{sb}$, generates a pulse (as shown) on its output terminal.

In other embodiments, flip flop 16 is omitted and the pulse output by detection circuitry 20 is coupled to the power supply 12 directly or via gate 28, with the latch effect provided by flip flop 16 being inside power supply 12.

Since in a typical computer system there are other sources (e.g., a timer, a mouse interrupt, a UART line, a ring indicator, or a keyboard controller interrupt) for a wake up event in addition to peripheral devices connected to the parallel port, these other sources are connected to other input lines 24 which together with the output terminal of the select rising edge detection logic 20 are connected to the input terminals of a logic gate 28, shown here as an AND gate. It is to be understood that other logic gate configurations can be used alternatively to logically combine the output pulse of the select rising edge detection circuitry 20 with the signals from the other sources on line 24. Thus when any of the wake up events happen, either the signal provided on the Select line or the signals from the other sources from lines 24 (these being logic low signals), the output signal at the output terminal of gate 28 becomes low. This output terminal is connected to the reset terminal of flip flop 16, and thus resets (by an active low signal) flip flop 16. Thus resetting flip flop 16 changes the output signal $\overline{ONCTL}$ to be logic low signal $\overline{ONCTL}$, switching the main power supply 12 so it reverts to outputting the main supply $V_{cc}$. Once the main supply $V_{cc}$ is provided, the computer CPU (not shown) automatically wakes up in a reset state and is fully operational.

Figure 2:
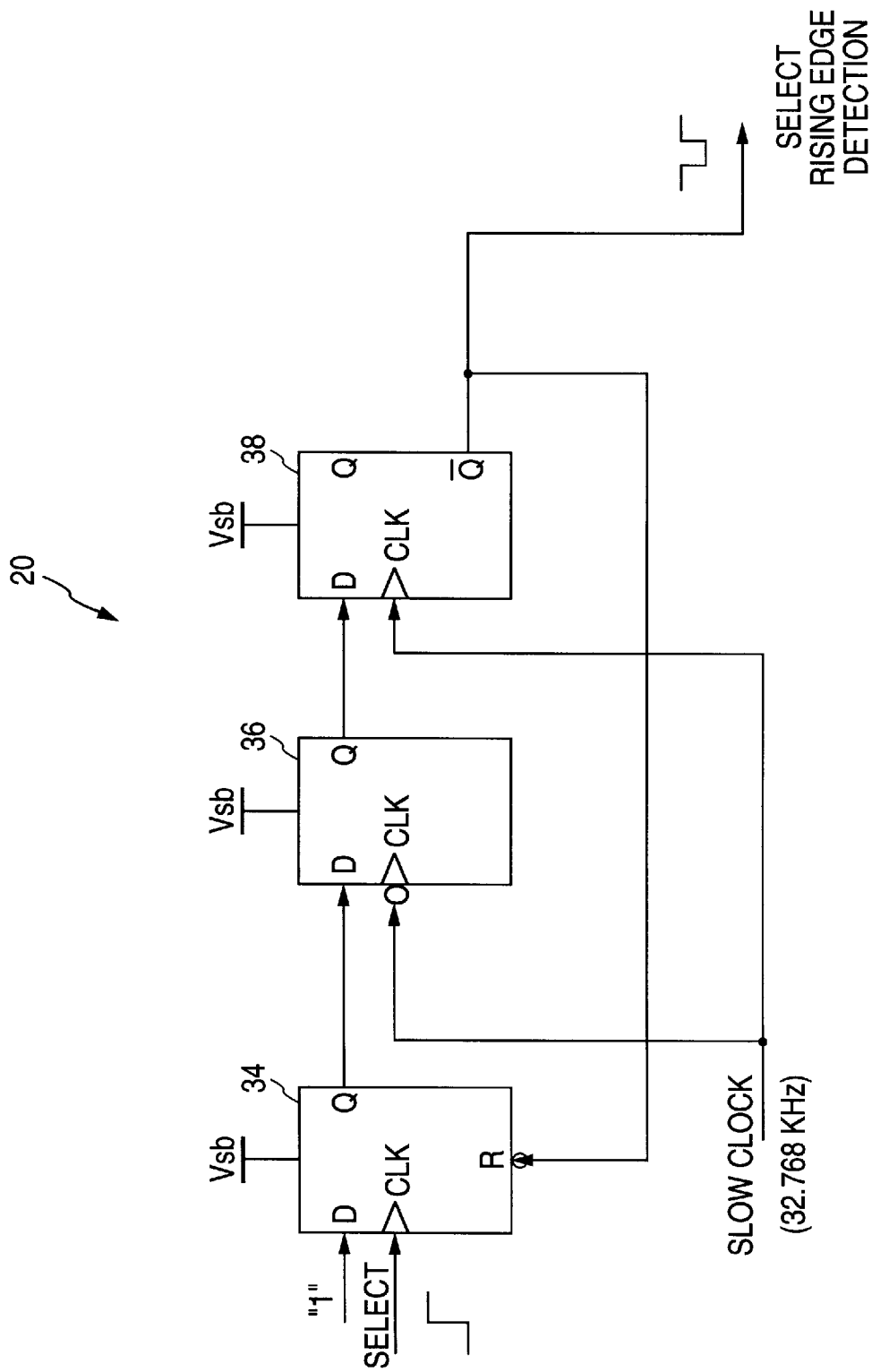
FIG. 2 shows detail of the select rising edge detection circuitry of FIG. 1.

Detail of one embodiment of the circuitry of select rising edge detection circuitry 20 of FIG. 1 is shown in FIG. 2. It is to be understood that this is just one embodiment and that other arrangements of circuit elements will provide the desired output pulse in response to a signal on the parallel port Select line; hence FIG. 2 is illustrative and not limiting. The select rising edge detection circuitry 20 of FIG. 2 generates an e.g. negative pulse whenever the incoming Select line signal transitions from low to high. Thus as shown in FIG. 2, the parallel port Select line is connected to the clock terminal of the first flip flop 34. The D (data) input terminal of flip flop 34 is tied off to a logic high (1) level signal. Thus the Select line transition causes the output signal at the Q output terminal of flip flop 34 to go high. The Q output terminal of flip flop 34 is connected to the D input terminal of flip flop 36.

The "slow clock" signal on the Slow Clock line is always active. (This conventional slow clock signal is of much lower frequency than the normal operating mode clock signal.) The next falling edge of the slow clock signal (shown for purposes of illustration as being at 32.768 kilohertz), clocks the clock (CLK) terminal of the second flip flop 36, latching the signal on its D input terminal into its Q output terminal. The Q output terminal of flip flop 36 is connected to the D input terminal of flip flop 38, which is clocked by the rising edge of the slow clock signal. Hence on the next rising edge of the slow clock signal, the signal on the D input terminal of flip flop 38 is latched into its Q output terminal.

The output signal of the third flip flop 38 on its $\overline{Q}$ (negative) output terminal in response goes low. This signal in turn resets the first flip flop 34 at its active low reset terminal R. A zero (logic low) output signal Q of the first flip flop 34 propagates in the same way through second and third flip flops 36, 38. Thus after one cycle the output signal from the first flip flop arrives at the third flip flop 38.

The $\overline{Q}$ output terminal signal of the third flip flop 38 is the output signal of the select rising edge detection circuit 20, which is (in this case) a negative pulse applied to one of the input terminals of AND gate 28 of FIG. 1.

Three flip flops are used here in detection circuitry 20 to resolve metastability, to prevent abnormal operation since the Select line is not synchronized to the slow clock signal. The third flip flop allows sampling twice, at two different times (with two clock signal edges). Thus alternatively one could use only two flip flops, or some other arrangement.

Also present in one embodiment (not illustrated) is logic circuitry connected to each of the input lines 24 to gate 28, and to the Select line. This logic circuitry provides a logic mask for each wake up event, so as to prevent any particular wake up event from waking up the computer, if the particular mask bit is set. Also provided in one embodiment is a status register having a bit for each wake up source. The reset routine software reads this register to determine which particular wake up event caused the wake up. This allows subsequent invocation of the appropriate application program. After the system CPU reads the status register during the reset routine, the status register bits are automatically cleared until the next wake up event.

This description is illustrative and not limiting. Further modifications will be apparent to one skilled in the art in light of this disclosure and are intended to fall within the scope of the appended claims.

We claim:

1. A method of powering up a computer system by a peripheral device connected to a parallel port of the computer system, the parallel port having a Select line, the method comprising:

operating the computer system in a standby mode, whereby power consumption of the computer system is reduced;

generating a signal at the peripheral device, the generating including:
toggling the signal from a first level to a second level; and
toggling back the signal from the second level to the first level;

transmitting the signal to the Select line of the parallel port of the computer system; and in response to the receipt of the generated signal at the parallel port, powering up the computer system to a normal operating mode, wherein the powering up includes:
detecting a transition in the level of the generated signal being toggled back from the second level to the first level.

2. The method of claim 1, wherein the powering up includes:

generating a pulse in response to the detected transition.

3. The method of claim 1, wherein the operating the computer system in a standby mode includes:

supplying a power save signal to a power control port of the computer system; and switching off a main power supply to the computer system in response to the power save signal.

4. The method of claim 1, wherein the powering up includes logically combining the generated signal with at least one other signal indicative of a state of the computer system.

5. The method of claim 1, wherein the powering up includes:

clocking at least one latch with the generated signal; and providing an output signal from the latch in response to being clocked.

6. An apparatus for powering up a power supply of a computer system in response to a signal applied to a Select line of a parallel port of the computer system, the power supply being operable in a normal operating state and in a power save state in response to a signal applied to its control port, the apparatus comprising:

a detection circuit coupled to the Select line of the parallel port, wherein the detection circuit generates a pulse in response to a signal on the Select line; and a circuit coupling the pulse to the control port of the power supply;

wherein the signal applied to the Select line is toggled from a first level to a second level and then toggled back from the second level to the first level, wherein the detection circuit detects the transition in level of the signal on the Select line being toggled back from the second level to the first level.

7. The apparatus of claim 6, the circuit comprising a latch having a reset terminal coupled to respond to the pulse generated by the detection circuit, the latch having a clock terminal coupled to respond to a control signal, and having an output terminal coupled to the control port of the power supply.

8. The apparatus of claim 7, further comprising a logic gate having a plurality of input terminals and an output terminal, one of the input terminals being connected to receive the pulse generated by the detection circuit, and the output terminal being coupled to the reset terminal of the latch.

9. The apparatus of claim 6, wherein the detection circuit comprises at least three series connected latches, an output terminal of a third latch in the series being connected to a reset terminal of a first latch in the series, and a clock terminal of the first latch in the series being coupled to the Select line.

10. An apparatus for powering up a power supply of a computer system in response to a signal applied to a Select line of a parallel port of the computer system, wherein the signal toggles from a first level to a second level and toggles back from a second level to a first level, the power supply being operable in a normal operating state and in a power save state in response to a signal applied to its control port, the apparatus comprising:

a detection circuit coupled to the Select line of the parallel port, wherein the detection circuit generates a pulse in response to the signal on the Select line;

wherein the detection circuit detects the transition in level of the signal on the Select line being toggled back from a second level to a first level;

a logic gate receiving the pulse from the detection circuit at a first input terminal, and receiving other pulses indicating a desired state of the computer system, and logically combining all the received pulses;

an address detection circuit receiving a plurality of input signals and decoding them to provide an output signal; and a resettable latch having a clock terminal connected to receive the output signal from the address detection circuit, a reset terminal connected to receive an output signal from the logic gate, and a data terminal connected to receive a signal indicative of a desired power state of the computer system, wherein an output terminal of the latch is coupled to the control port of the power supply.

* * * * *